(12) United States Patent
DeGennaro

(10) Patent No.: US 10,239,496 B2
(45) Date of Patent: Mar. 26, 2019

(54) WIPER BLADE ASSEMBLY PROTECTOR AND METHOD OF PROTECTING A WIPER BLADE ASSEMBLY

(71) Applicant: Sergio K. DeGennaro, Westbury, NY (US)

(72) Inventor: Sergio K. DeGennaro, Westbury, NY (US)

( * ) Notice: Subject to any disclaimer, the term of this patent is extended or adjusted under 35 U.S.C. 154(b) by 0 days.

(21) Appl. No.: 16/157,287

(22) Filed: Oct. 11, 2018

(65) Prior Publication Data

US 2019/0061694 A1 Feb. 28, 2019

Related U.S. Application Data

(63) Continuation of application No. 15/399,870, filed on Jan. 6, 2017.

(60) Provisional application No. 62/275,844, filed on Jan. 7, 2016.

(51) Int. Cl.
*B60S 1/04* (2006.01)
*B60S 1/38* (2006.01)
*B65D 59/04* (2006.01)

(52) U.S. Cl.
CPC ..... *B60S 1/0491* (2013.01); *B60S 2001/3843* (2013.01); *B65D 59/04* (2013.01); *B65D 2543/0037* (2013.01); *B65D 2585/6885* (2013.01)

(58) Field of Classification Search
CPC .......... B60S 1/0491; B60S 2001/3843; B65D 2585/6885; B65D 2251/06; B65D 2585/68; B65D 2543/00009; B65D 2543/0037; B65D 2543/00379; B65D 1/00; B65D 59/04

USPC .............. 15/257.01, 250.001; 150/154, 166; 220/229, 916, 709, 810; 206/349, 335, 206/527

See application file for complete search history.

(56) References Cited

U.S. PATENT DOCUMENTS

| | | |
|---|---|---|
| 1,831,859 A | 11/1931 | Harvey et al. |
| 1,833,307 A | 11/1931 | Riggs |
| 1,885,710 A | 11/1932 | Gentry et al. |
| 1,947,013 A | 2/1934 | Lauchin |
| 1,980,254 A | 11/1934 | Cartwright |
| 1,988,560 A | 1/1935 | Dahlstrom et al. |
| 2,034,880 A | 3/1936 | Sackett |
| 2,089,357 A | 8/1937 | Grece |
| 2,119,587 A | 6/1938 | Lamb |
| 2,164,829 A | 7/1939 | MacRobert |
| 2,372,813 A | 4/1945 | Darling |
| 2,412,850 A | 12/1946 | Whitted |

(Continued)

FOREIGN PATENT DOCUMENTS

| | | |
|---|---|---|
| CN | 201729142 U | 2/2011 |
| DE | 2147729 | 3/1973 |

(Continued)

*Primary Examiner* — Gary K. Graham
(74) *Attorney, Agent, or Firm* — Gottlieb, Rackman & Reisman, P.C.

(57) ABSTRACT

A protector for a windshield wiper assembly includes an elongated body defining a cavity receiving at least the blade of the wiper assembly. The cover is used to protect the assembly from snow, ice, mud, etc. Preferably, the assembly is pivoted away from the windshield before the blade is inserted into the body. Caps with decorative covers are provided at the ends of the body. The body may be made of a translucent material and may be covered with logos, insignia and other advertising materials.

6 Claims, 10 Drawing Sheets

(56) References Cited

U.S. PATENT DOCUMENTS

| | | | |
|---|---|---|---|
| 2,422,761 A | 6/1947 | Ungerland |
| 2,703,902 A | 3/1955 | Thomas et al. |
| 2,751,952 A | 6/1956 | Gilbert |
| 3,068,316 A | 12/1962 | Witt |
| 3,087,585 A | 4/1963 | Knuth |
| 3,201,818 A | 8/1965 | Linker |
| 3,380,504 A | 4/1968 | Green |
| 3,407,427 A | 10/1968 | Kebbon |
| 3,523,626 A | 8/1970 | Racine et al. |
| 3,619,556 A | 11/1971 | Deibel |
| 3,820,677 A | 6/1974 | Garcia |
| 3,899,100 A | 8/1975 | Rigaud |
| 4,194,261 A | 3/1980 | Parkinson |
| 4,768,823 A | 9/1988 | Martinez |
| 4,884,717 A | 12/1989 | Bussard |
| 4,928,345 A | 5/1990 | Meltzer et al. |
| 5,518,143 A | 5/1996 | Iodice |
| 5,572,765 A | 11/1996 | Guell |
| 5,593,059 A | 1/1997 | Neilson |
| 5,881,428 A | 3/1999 | Simmons |
| 6,327,738 B1 | 12/2001 | Lewis |
| 6,705,660 B2 | 3/2004 | Muehlpforte et al. |
| 6,986,433 B2 | 1/2006 | Colford |
| D586,716 S | 2/2009 | Radfar |
| 7,673,924 B1 | 3/2010 | Lau |
| 7,766,168 B2 | 8/2010 | Thrapp |
| 8,302,798 B2 | 11/2012 | Moss |
| 8,393,046 B2 | 3/2013 | Schneider |
| 8,397,944 B1 | 3/2013 | Landes |
| 2005/0235448 A1 | 10/2005 | Richard |
| 2006/0266453 A1 | 11/2006 | Cirone |
| 2009/0145874 A1 | 6/2009 | Hite |
| 2010/0096377 A1 | 4/2010 | Zubrecki |
| 2011/0192511 A1 | 8/2011 | Marrone |
| 2013/0000802 A1 | 1/2013 | Rees |

FOREIGN PATENT DOCUMENTS

| | | |
|---|---|---|
| DE | 29700276 | 4/1997 |
| FR | 2871105 A1 | 12/2005 |
| WO | 7900402 A1 | 7/1979 |

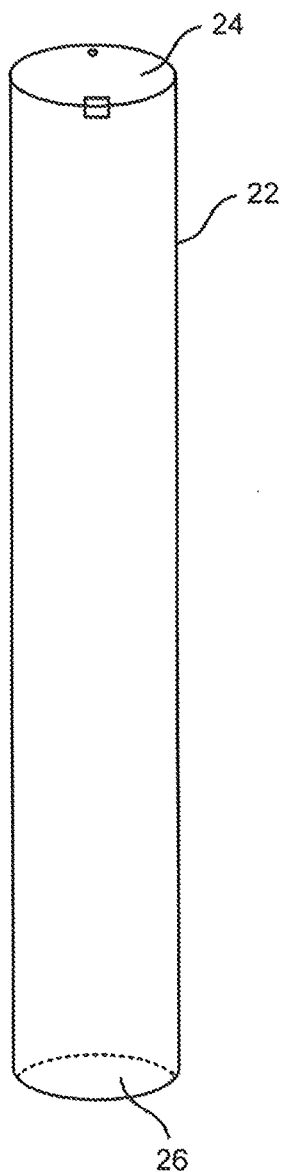
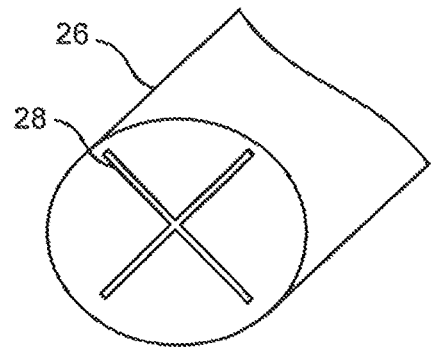
FIG. 4A
FIG. 4B
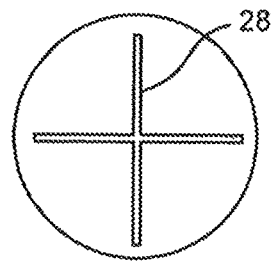
FIG. 4C
FIG. 4

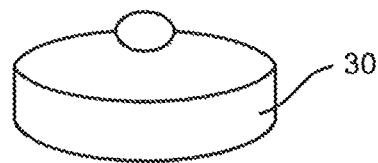
FIG. 6A
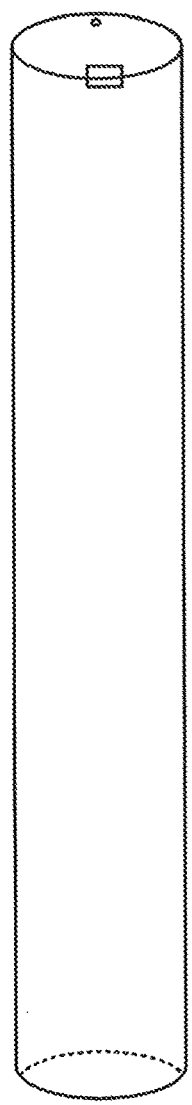
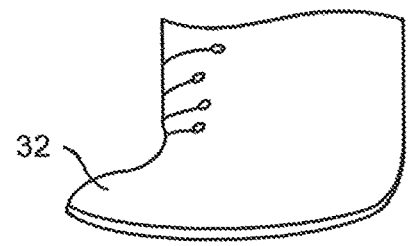
FIG. 6B
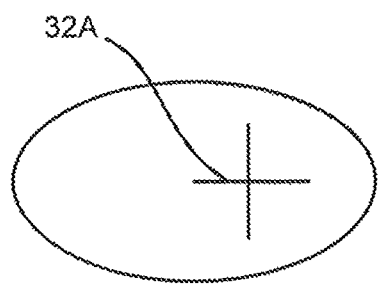
FIG. 6                    FIG. 6C

WIPER BLADE ASSEMBLY PROTECTOR AND METHOD OF PROTECTING A WIPER BLADE ASSEMBLY

RELATED APPLICATIONS

This application claims priority to U.S. patent application Ser. No. 15/399,870 filed Jan. 6, 2017, which in turn claims priority from provisional patent application No. 62/275,844, filed Jan. 7, 2016, both of which are incorporated herein by reference in their entirety.

BACKGROUND OF THE INVENTION

A. Field of Invention

This invention pertains to a device for protecting the wiper blade assemblies of a motor vehicle during inclement weather, such as ice and snow when motor vehicle ignition is off and the motor vehicle is in a non-operational, parked position.

B. Description of the Prior Art

All motor vehicles on the road today are equipped with windshield wiper devices for cleaning the motor vehicle windshields to remove any materials deposited thereon, such as water, dust, mud, ice, snow, etc. Such devices typically include two components: an arm having one end attached directly or indirectly to a reciprocating shaft disposed just under the windshield and a wiper blade pivotally attached to the opposite end of the arm. Two such arms are disposed below or (in rare occasions, above) the main or front windshield. In addition, some cars, especially high end cars, and suburban utility vehicles (SUVs), may also have at least one wiper on the rear window of the vehicle. These devices are safety devices mandated by the federal government or other authorities.

Importantly, the wiper blades are made of a soft rubber-like material that form a doctoring edge configured to wipe the windshield in a continuous sweeping motion even when the windshield has concave shape. As such, these blades are usually made from a somewhat soft and fragile material because otherwise the blade would not be able to wipe the windshield in a smooth motion without scratching, scoring or otherwise permanently damaging the windshield. A holder is used to mount the blade on the arm. The combination of the arm and blade shall be referred to herein as a wiper blade assembly.

A major problem with existing windshield wipers is that under inclement weather, such as a snow storm, snow falls on the windshield and freezes into a sheet of ice, or a mixture of ice and snow, that covers both the windshield wiper arm and the windshield wiper blade. The ice and frozen snow mix often get packed in a cavity below the full windshield, the same cavity that also holds the wiper arms and blades. Once the wiper arm and wiper blade become embedded lodged in this mix, it is extremely difficult and time consuming to properly dislodge it. Often an operator will prematurely try to engage or activate the wipers while the ice and frozen mix is still present. The torque from the wiper arm causes the wiper arm to become dislodged and break free from the wiper blade at the plastic assembly. This action renders the wiper blade assembly useless until replaced its wiper blade is replaced. Additionally, permanent windshield damage may occur as the bladeless metal arm streaks across the windshield and to the motor driving the arms. Thus, before the vehicle is driven, the ice and snow must be cleared off both the windshield and the wiper blade assembly. Otherwise, when the windshield wiper is operated, the hard ice on the wiper causes unacceptable and unsafe streaks on the windshield. Moreover, operating the wipers under these conditions can cause damage to the blades to the point where they become unusable and in extreme cases operating any vehicle under these conditions my cause an accident until the blades can be replaced. In other words, the blades can also be easily damaged when one attempts to clean them and remove the frozen ice and snow from them.

Some people try to solve at least some of these problems by leaving the vehicle with the arms snapped into a position, fully away from the windshield at the manufacturer installed wiper arm pivot point. However, this action does not prevent the arm from being damaged.

The present invention provides a cheap, reliable and esthetically pleasing solution to these problems.

SUMMARY OF THE INVENTION

According to this invention, a protector is provided for protecting a windshield wiper assembly having a wiper blade, and an arm turning the wiper blade and the holder, the holder having a blade length. The protector includes tubular body having a body length at least equal to the blade length and defining an internal cavity with at least one opening on one end of said tubular body. A cap is covering the opening, the cap having a flexible cutout configured to selectively receive the wiper blade in said cavity to protect the wiper blade.

Preferably, the body of the protector includes a second cap opposite first cap. Covers are disposed over either one or both of the caps. The covers may include whimsical features or objects, such as caps, socks, protectors, etc. Alternatively, the covers with decorative features are used instead of caps. The cover on the first opening is removable to provide access to said cutout.

In one embodiment, the body has an outer surface with printed material, such logos, or advertisements. The body may be made of a transparent or translucent material.

In one embodiment, a method is presented for protecting the wiper blade assembly. The method includes covering the blade of the assembly with protector when inclement weather is expected, and removing the cover before driving the motor vehicle. Preferably, before the protector is installed, the windshield wiper assembly is pivoted away from the windshield so that the wiper blade is not in contact therefrom. The blade is then inserted into the body opening until it is substantially disposed within the body cavity. The windshield wiper assembly can be left in this pivoted position, or it can be pivoted back against the windshield.

BRIEF DESCRIPTION OF THE DRAWINGS

FIG. 4 shows a side view of the sleeve;

FIGS. 4A-4C show, respectively, an isometric view, a top and a side view of a first bottom cover for the sleeve;

FIG. 6 shows a side view of the sleeve of FIG. 5;

FIGS. 6A-6C show, respectively, an isometric view of the top cover, the bottom cover, and a bottom view of the bottom cover.

DETAILED DESCRIPTION

Figure 1:
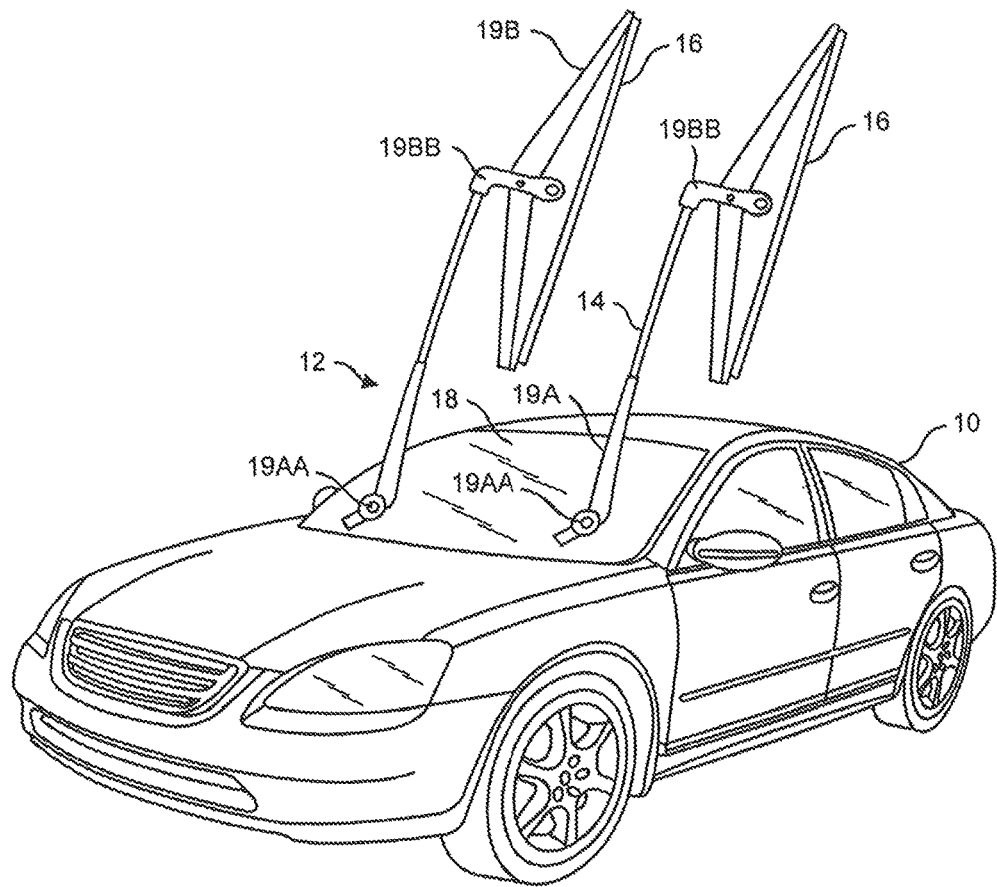
FIG. 1 shows a car with unprotected windshield wiper blade assembly pivoted in a conventional manner.

FIG. 1 shows an orthogonal view of a typical car 10. It has two windshield wiper assemblies 12, 14 with respective wiper blades 16 (for the sake of clarity, the windshield wiper assemblies 12, 14 are shown enlarged disproportionally to the rest of the car 10). The windshield wiper assemblies 12, 14 are reciprocated so that they move in respective arcs along windshield 18, thereby sweeping off snow, rain, mud, etc. Each assembly includes an arm 19A, having one end 19AA attached to the shaft (not shown) of a motor (not shown) typically disposed below the windshield 18. An arcuate holder 19B is attached to the other end 19BB of arm 18. The holder 19B is used to support a wiper blade 16. The shaft moves the arms 19A and respective holders 19B and blade in an arc as discussed above.

In addition, assemblies 12, 14 can also be pivoted manually away from the windshield 18 at end 19AA to the positions shown in FIG. 1. As discussed above, when car 10 is not in use, some people pivot the windshield wipers away from the windshield 18 during a snow and/or ice storm. The assemblies 12, 14 are designed and installed by the manufacturer of typical automobiles. Their configuration has been selected to allow an owner to pivot the assemblies and lock securely in place and make room so that the owner can fully cleaning the windshield 18 and the trench below the windshield used to house the assemblies when not in use. In this manner the owner can then clean the windshield 18 easily without the fear of damaging the wiper blade assemblies 12, 14. Once the windshield 18 is cleaned, the assemblies can be rotated and will snap back to their original, operating position.

Figure 2:
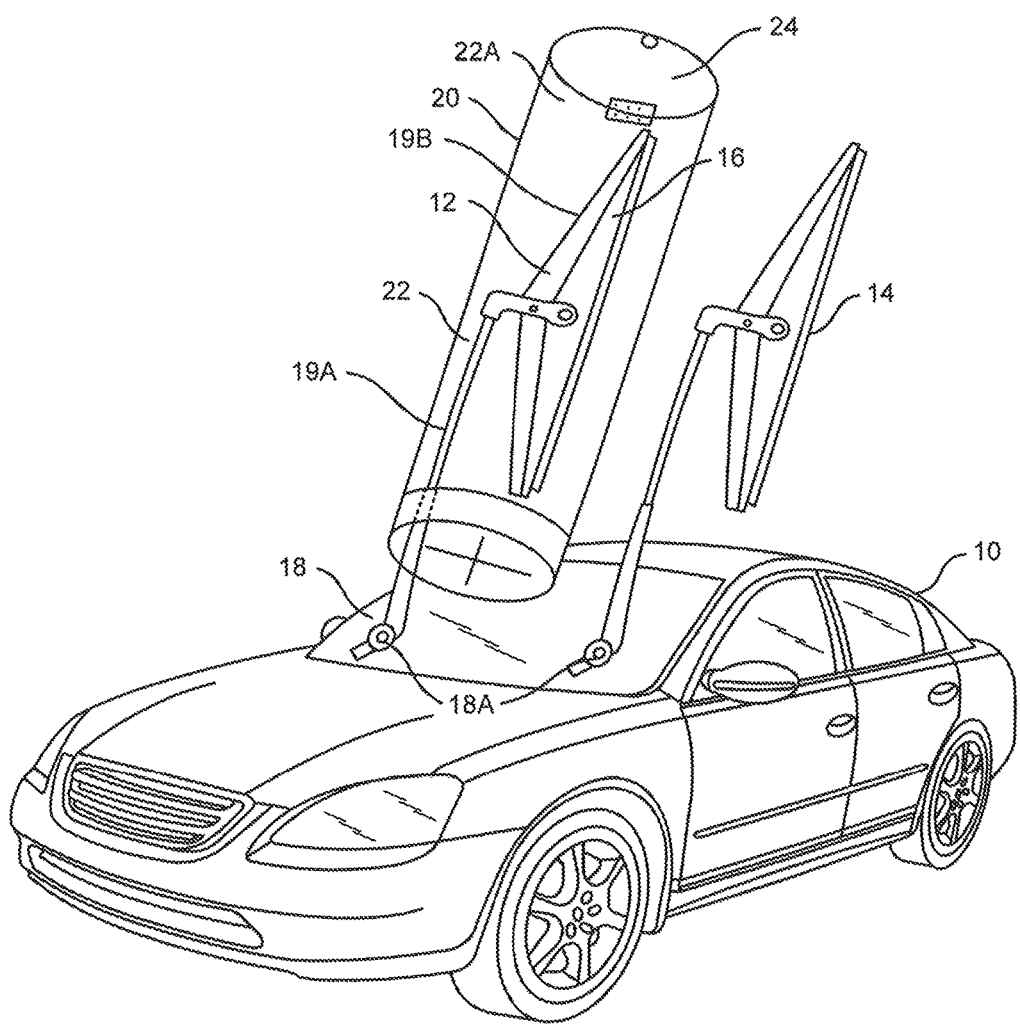
FIG. 2 shows the car of FIG. 1 with one of the wipers protected by a sleeve constructed in accordance with this invention.

FIG. 2 shows the same car 10 with one of the windshield wiper assembly 12 being provided with a protective protector or protector 20. Once the protector 20 is mounted on the wiper assembly 12 the wiper can be left in the upright pivoted position shown or can be snapped back (the arms are spring loaded) so that the protector 20 rests against the windshield 18. Protector 20 protects the upper portion of the arm 19A, the holder 19B and the blade 16 from the elements. When the protector 20 is removed, the wiper assembly, including and blade 16 are clear of snow and ice and ready to operate.

Figure 3:
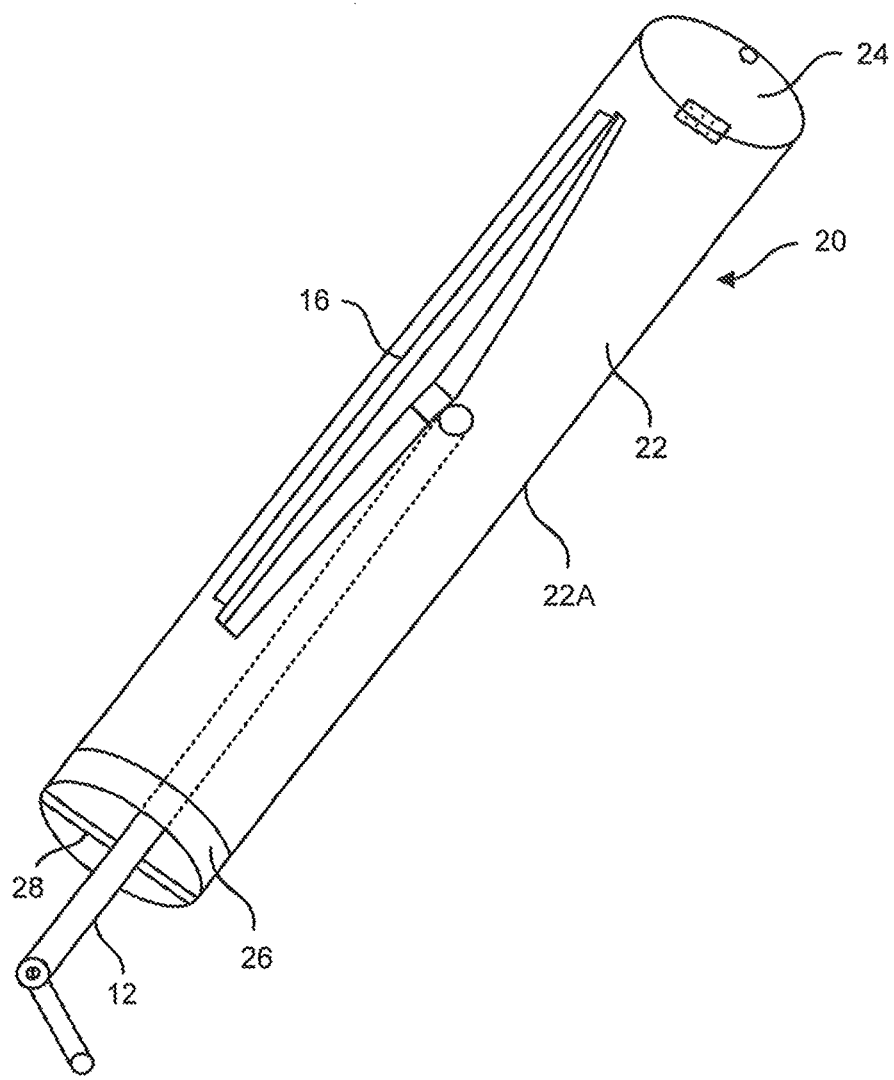
FIG. 3 shows an isometric view of the blade disposed on the sleeve.
Figure 5:
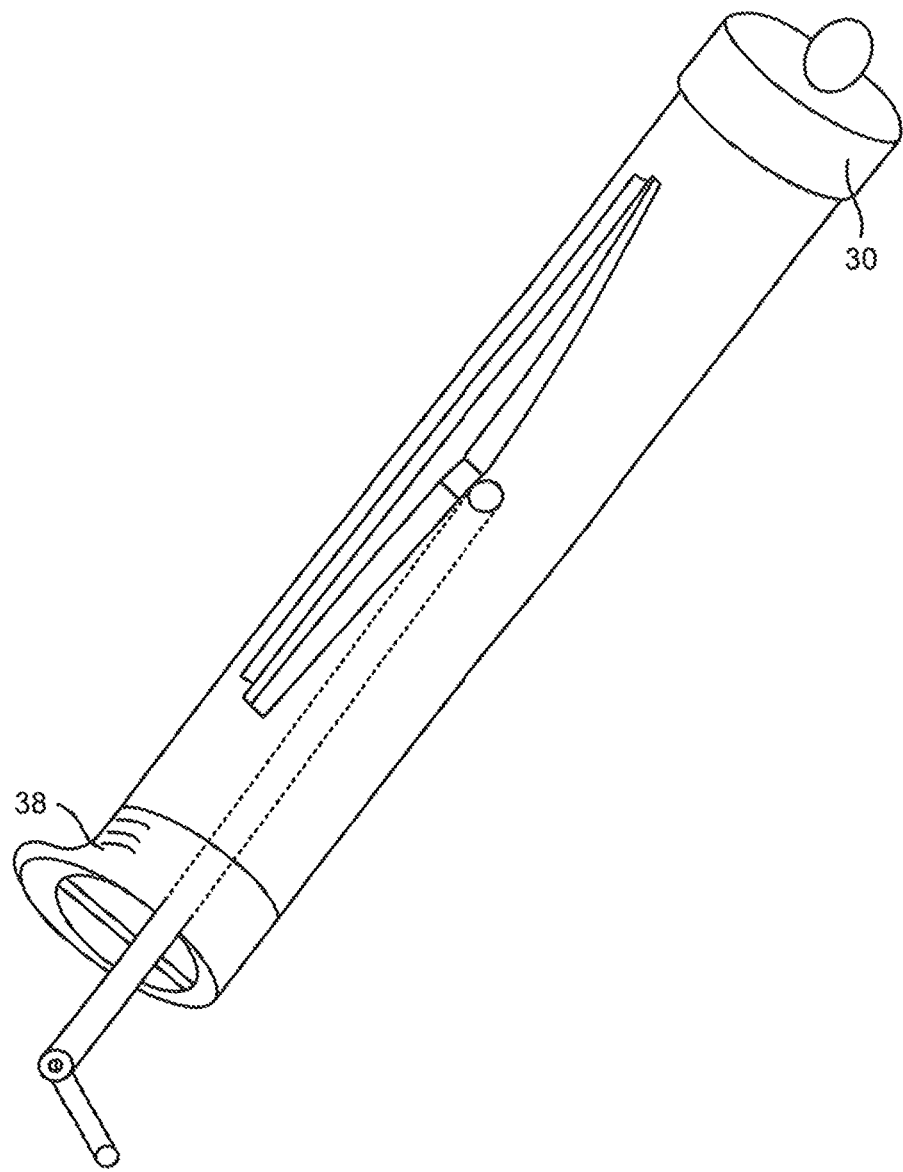
FIG. 5 shows an isometric view of a sleeve having a top cover in the shape of a hat and a bottom cover in the shape of a protector.

As shown in FIGS. 2 and 3, preferably, the protector 20 is formed of a body or sleeve 22 that has a generally tubular shape with a circular or oval cross-section as shown. However, ease in manufacturing or usage may dictate many types of the sleeve 20 shapes. The sleeve 22 can be transparent or translucent or its outer surface 22A can be imprinted with the name of a company for advertising purposes, or with other messages. The sleeve defines a cavity. Preferably, one end of sleeve 22 is closed off by a top cap 24.

Preferably cap 24 is attached permanently to the sleeve 22 and is water tight to protect the wiper assembly 12. At the opposite end, the sleeve 22 is provided with a second cap or bottom 26. This bottom cap 26 can permanently attached to the sleeve 22 or can be removable (see FIGS. 4, 4A, 4-4C).

Bottom cap 26 is formed with a cut 28 to provide access to the interior space of the sleeve 22. The cut 28 in one embodiment is cross-shaped. The bottom cap 26 is made of a somewhat flexible material, such as a plastic material to allow portions of the cap 26, especially on flat surface 30 to bend inwardly as the wiper assembly 12 is pushed into the sleeve 22. The functional purpose of bottom cap 26 is to impede snow and ice from entering sleeve 22.

In one embodiment, various whimsical accessories may be attached to the sleeve to make the protector 20 more attractive and fun to use. The various FIGS. 5-10 show details of some of these accessories. In FIG. 5, 6, 6A-6C the cap 24 or is covered by, or replaced with a knitted hat-like decorative object 30. In addition to the hat-like decorative object 30, a shoe-shaped bottom cover 32 is used on top of, or to replace bottom cap 26. Shoe-like bottom cover 32 is formed with an X-shaped cutout out 32A (See FIGS. 68, 6C).

Figure 7A:
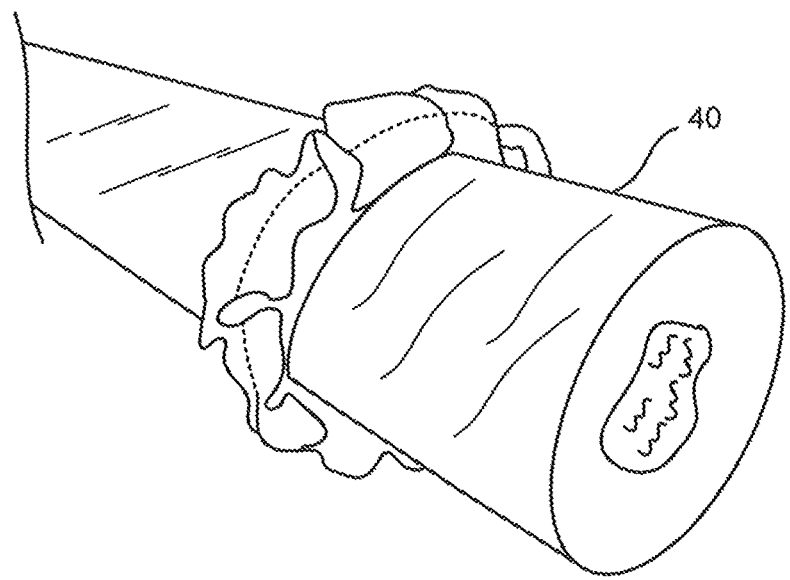
FIGS. 7A and 7B show isometric views of a sock used as a top cover and a soft bottom cover.
Figure 7B:
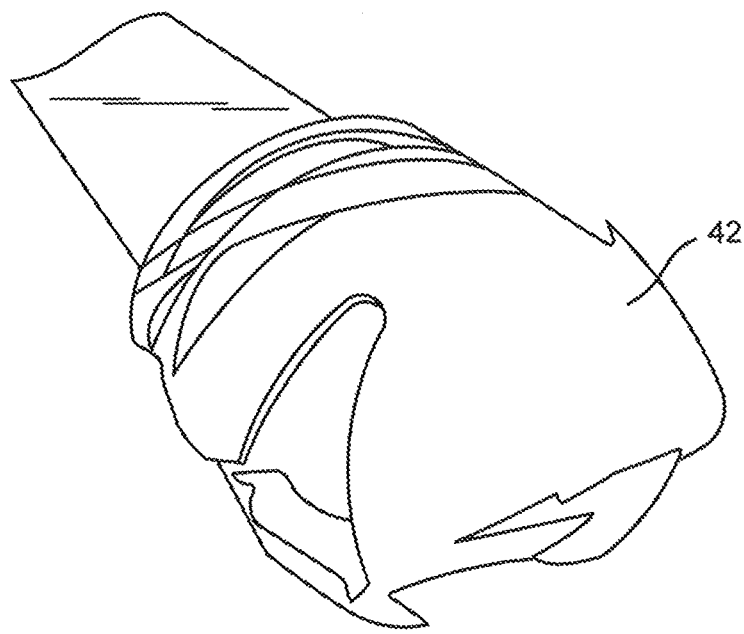

FIG. 7A shows a frilly sock 40 used as a top cover over cap 24 and FIG. 7B shows a frilly bottom cover 42 on end 26.

Figure 8A:
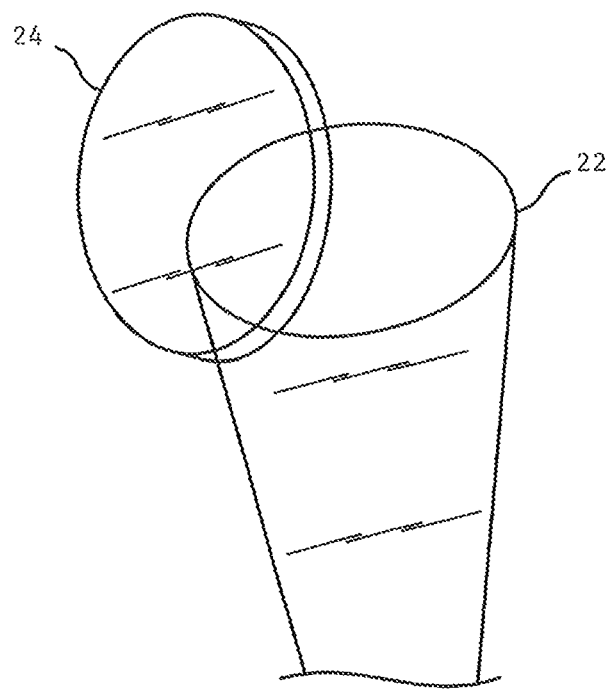
FIG. 8A shows a disc shaped top cover.
Figure 8B:
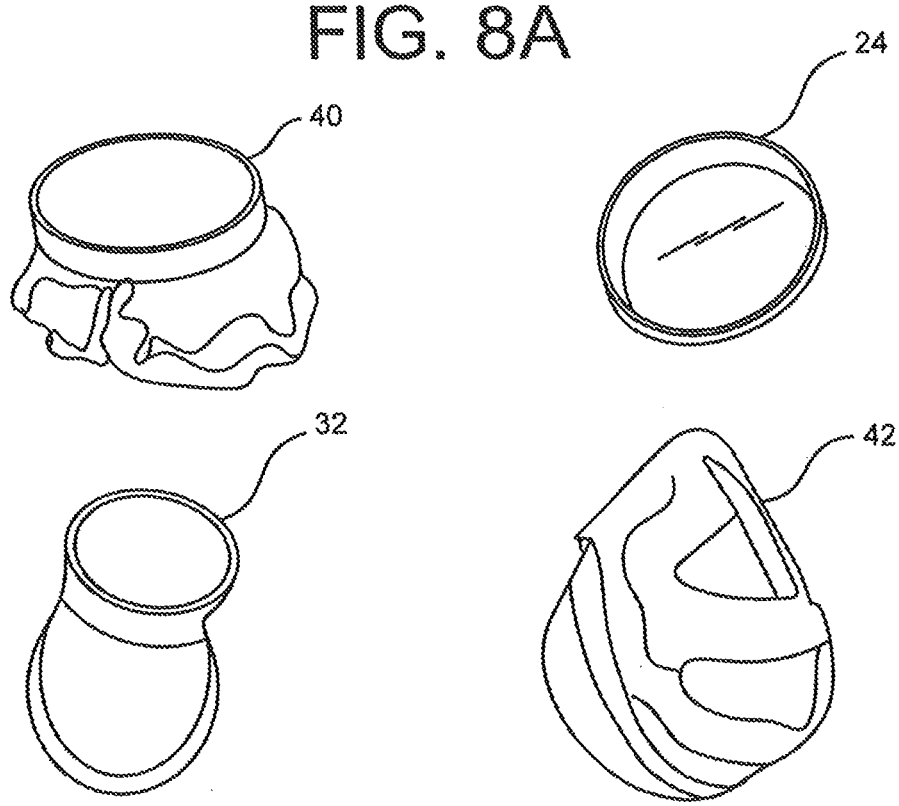
FIG. 8B shows isometric views of a sock-shaped cover, a disc-shaped cover, a protector shape bottom cover and a soft bottom cover.
Figure 9A:
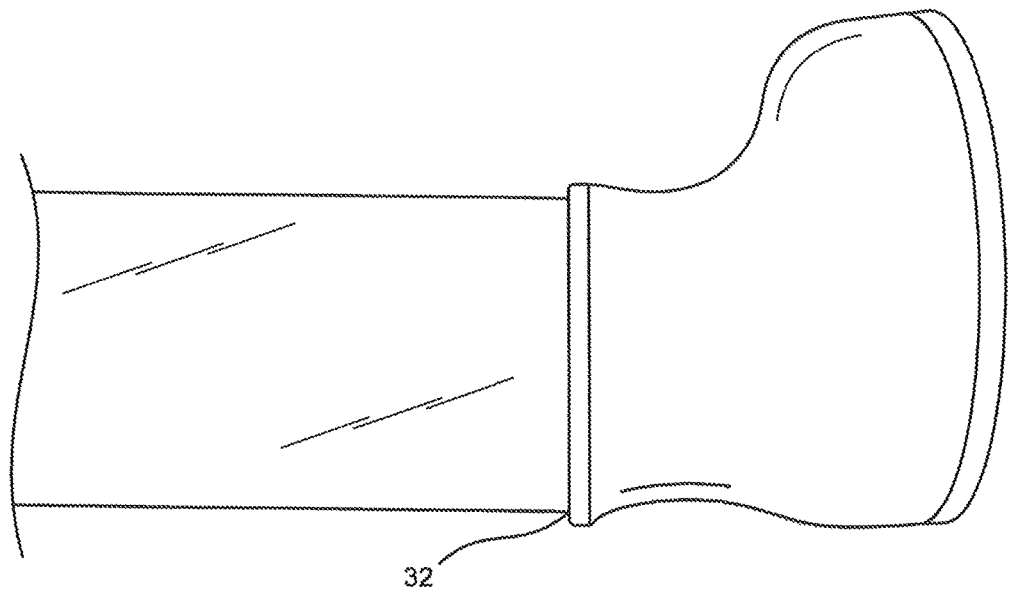
FIGS. 9A and 9B show side close-up views of the protector-shaped bottom cover and sock shaped top cover.
Figure 9B:
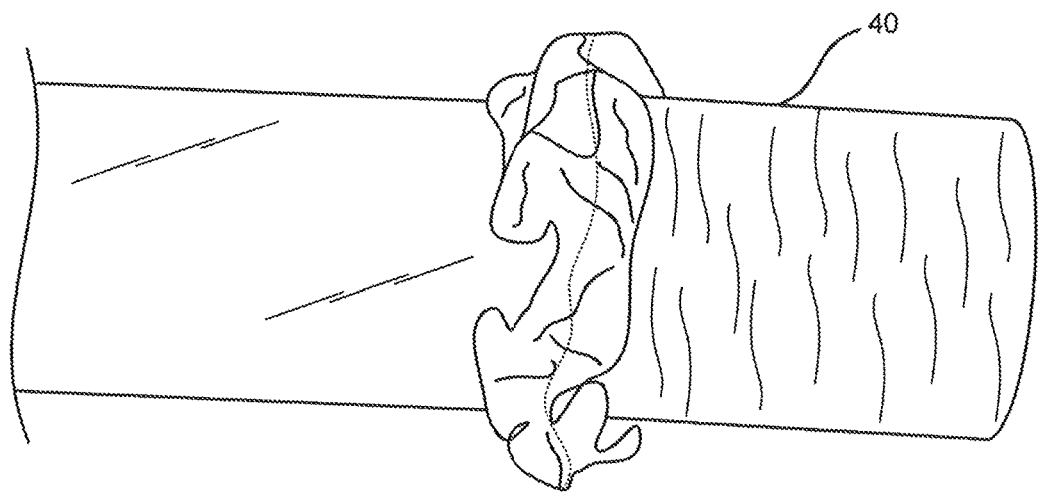
Figure 10:
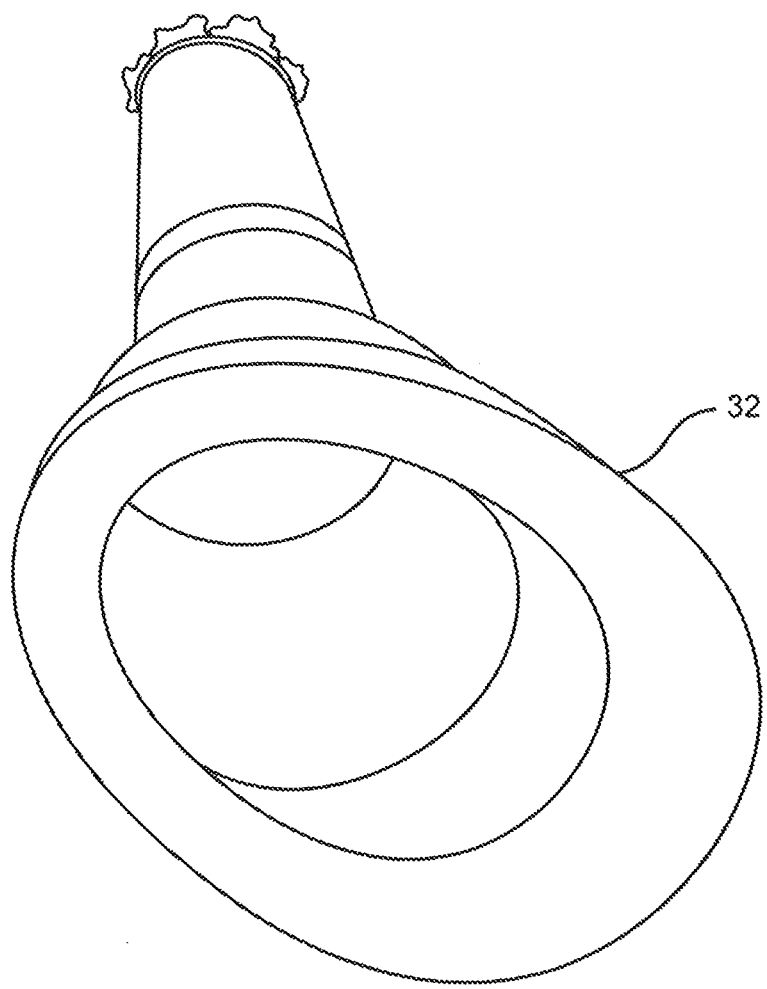
FIG. 10 shows a bottom view of an alternate embodiment of the protector cover.

FIGS. 8A, 8B shows cap 24 on sleeve 22 with other objects 24, 32, 40, 42 that can be used as top covers. FIGS. 9 and 10 show more pictures of the frilly objects.

In summary, a protector 20 is provided that includes a sleeve 22, a top cap 24 and a bottom cap 26. The caps can be covered with or replaced by one or more frilly or decorative objects. The sleeve 20 is pulled over the wiper assemblies 12, 14, and more particularly, at least the blade is inserted into the cavity formed by sleeve 20 to protect the assemblies and their respective blades 16 during a snow or ice storm. Preferably the sleeve or body 22 has a body length that is at least equal to the length of the blade to provide protection to the blade.

A protector 20 is easily and rapidly installed on each wiper assembly 12, 14. After the storm, they can be removed, shaken off and the wiper assemblies 12, 14 can be simply returned to their operational positions, The protectors 20 are stored for use for the next storm.

In one embodiment, each protector 20 (FIG. 2) is packaged singly or in pairs and sold with, or without a new replacement wiper blade 16 (or a blade 16 and a holder) and decorative accessories.

In one embodiment, each new/replacement windshield wiper 12, 14 is packaged and sold inside the protector 20. The customer can remove the windshield wiper from the protector 20 by lifting the wiper arm assembly at the pivot arm point 18 (FIG. 2) to secure the wiper arm and wiper blades away from the windshield and install it on motor vehicles as needed. In one configuration, the outer surface 22A of sleeve 20 can be used to provide the name of the manufacturer of the wiper 12, 14, instructions for installing the wipers, instructions for installing the protector 20, etc., the names of other parties associated with automotive products, or names of entities normally unrelated to automotive products or services.

Numerous modifications may be made to the invention without departing from its scope as defined in the appended claims.

The invention claimed is:

1. A wiper system comprising:
   at least one replaceable windshield wiper blade having a length;
   a protector comprising a tubular body having a body length at least equal to said length of said blade and first and second ends, said tubular body defining an internal cavity with an opening on said first end of said tubular body;
   a cap covering said opening, said cap having a flexible cutout configured such that said wiper blade is passable lengthwise therethrough in a first direction and be entirely received inside said cavity in order to protect the wiper blade;
   wherein said wiper blade is passable lengthwise through said cutout of said cap in a second opposite direction in order to remove said wiper blade from said internal cavity; and
   wherein said cap, including said cutout, is designed to impede snow and ice from entering said internal cavity.

2. The system of claim 1, wherein said second end of said tubular body is closed off completely.

3. The system of claim 2, further including a second cap located at said second end of said tubular body for completely preventing access into said cavity from said second end.

4. A wiper system comprising:
   a windshield wiper assembly comprising at least one replaceable windshield wiper blade having a length, a holder for the wiper blade, and an arm for turning the holder when the wiper blade is attached to the holder;
   a protector comprising a tubular body having a body length at least equal to said length of said blade and first and second ends, said tubular body defining an internal cavity with an opening on said first end of said tubular body;
   a cap covering said opening, said cap having a flexible cutout configured such that said holder with said attached wiper blade can pass therethrough in a first direction and be entirely received inside said cavity in order to protect the wiper blade;
   wherein said holder with said attached wiper blade is designed to pass through said cutout of said cap in a second opposite direction in order to remove said holder with said attached wiper blade from said cavity;
   wherein said cap, including said cutout, is designed to impede snow and ice from entering said internal cavity.

5. The system of claim 4, wherein said second end of said tubular body is closed off completely.

6. The system of claim 4, further including a second cap located at said second end of said tubular body for completely preventing access into said cavity from said second end.

* * * * *